US008843957B2

(12) United States Patent
Lemire et al.

(10) Patent No.: US 8,843,957 B2
(45) Date of Patent: Sep. 23, 2014

(54) FRAME ACCURATE CONTENT INSERTION SYSTEM

(75) Inventors: Christopher M. Lemire, Flemington, NJ (US); Forest D. Johns, Weehawken, NJ (US)

(73) Assignee: Accenture Global Services Limited, Dublin (IE)

( * ) Notice: Subject to any disclaimer, the term of this patent is extended or adjusted under 35 U.S.C. 154(b) by 289 days.

(21) Appl. No.: 13/049,642

(22) Filed: Mar. 16, 2011

(65) Prior Publication Data

US 2011/0314493 A1    Dec. 22, 2011

Related U.S. Application Data

(60) Provisional application No. 61/356,964, filed on Jun. 21, 2010.

(51) Int. Cl.
| | |
|---|---|
| H04N 7/10 | (2006.01) |
| H04N 7/025 | (2006.01) |
| H04N 21/858 | (2011.01) |
| H04N 21/845 | (2011.01) |
| H04N 21/81 | (2011.01) |
| H04N 21/234 | (2011.01) |
| H04N 21/242 | (2011.01) |
| H04N 21/236 | (2011.01) |

(52) U.S. Cl.
CPC ........... *H04N 21/812* (2013.01); *H04N 21/858* (2013.01); *H04N 21/8455* (2013.01); *H04N 21/23424* (2013.01); *H04N 21/242* (2013.01); *H04N 21/23614* (2013.01)
USPC ................... 725/36; 725/32; 725/35; 725/82; 725/85; 725/139

(58) Field of Classification Search
USPC ............. 725/32–36, 42, 78, 82, 85, 131, 139, 725/151; 348/528
See application file for complete search history.

(56) References Cited

U.S. PATENT DOCUMENTS

| | | | | |
|---|---|---|---|---|
| 5,559,949 | A * | 9/1996 | Reimer et al. ............... | 715/720 |
| 8,522,273 | B2 * | 8/2013 | Huber et al. ................. | 725/34 |
| 2003/0056213 | A1 * | 3/2003 | McFaddin et al. ........... | 725/32 |
| 2004/0239803 | A1 * | 12/2004 | Selby et al. .................. | 348/459 |
| 2006/0075449 | A1 * | 4/2006 | Jagadeesan et al. .......... | 725/113 |
| 2007/0162568 | A1 | 7/2007 | Gupta et al. | |
| 2009/0006643 | A1 | 1/2009 | Lee .............................. | 709/231 |
| 2009/0119722 | A1 * | 5/2009 | VerSteeg et al. ............ | 725/87 |
| 2012/0096486 | A1 * | 4/2012 | Stallard et al. ............... | 725/32 |

FOREIGN PATENT DOCUMENTS

WO      WO 02/093920      11/2002

OTHER PUBLICATIONS

European Search Report, App. No. 11005012.7-2202, dated Sep. 19, 2011.

* cited by examiner

*Primary Examiner* — Pinkal R Chokshi
(74) *Attorney, Agent, or Firm* — Brinks Gilson & Lione (57) ABSTRACT

A content insertion system helps digital media providers insert replacement content (e.g., localized commercials) at precisely the right places in the video streams delivered to downstream players. Specifically, with frame accuracy, the system inserts content insertion triggers into the delivered video streams. From a source video input, the system determines the trigger positions at which insertion triggers exist with reference to house timecode. The system then locates the corresponding trigger positions in the output video stream with reference to a framecount of frames generated by a digital encoder. The system inserts corresponding content insertion triggers into the delivered video stream when it locates the corresponding trigger positions.

14 Claims, 10 Drawing Sheets

| Content Trigger Table | | 216 |
|---|---|---|
| Trigger ID 1  406 | Timecode 1  408 | Framecount 1  410 |
| ... | ... | ... |
| Trigger ID n | Timecode n | Framecount n |

402 — (Trigger ID 1 row)
404 — (Trigger ID n row)

FRAME ACCURATE CONTENT INSERTION SYSTEM

CROSS REFERENCE TO RELATED APPLICATION

This application claims the benefit of priority under 35 U.S.C. §119(e) to U.S. Pat. App. No. 61/356,965, filed Jun. 21, 2010, which is hereby incorporated by reference in its entirety.

BACKGROUND OF THE INVENTION

1. Technical Field

This disclosure relates to content insertion into digital media streams. In particular, this disclosure relates to providing frame accurate content insertion triggers in digital video streams communicated to downstream endpoints.

2. Related Art

Content providers have long faced the problem that their global programming often includes commercial content not relevant to destination markets. Consider, for example, live broadcast video of a ping pong tournament from South Korea. The original broadcast would typically include commercials in the Korean language and specific to Korean products and services. Although suitable for the primary market in South Korea, those commercials are of little or no value for a secondary market, for example the United States or Brazil. In an age of worldwide satellite and cable distribution of programming, there are enormous possibilities for reaching additional markets, but corresponding challenges in localization.

For this reason, broadcast networks have evolved to include mechanisms for local commercial replacement. The replacement is highly accurate and reliable. In particular, the replacement happens on a "frame accurate" basis, which means that local content providers can insert a replacement commercial starting at any desired frame within the video stream. One way in which frame accurate replacement has been done is to insert special dual tone multifrequency (DTMF) tones in the live content stream (e.g., in a subband in the accompanying audio). Local content providers have the benefit of accurate timecode that accompanies the broadcast, and are able to find the DTMF tones and interpret them as content insertion triggers. Because the timing of playout of content is known down to the frame level, the local content providers can replace commercial content with locally relevant commercials without any degradation to the original broadcast, and do so consistently across all of their subscribers.

At the same time, explosive growth and development in high speed digital communication technologies, coupled with highly efficient encoding, today makes virtually any content available anywhere in the world, given a suitable Internet connection. Timecode, however, is not generally available in digitally encoded video. Instead, digital communication of broadcast video relies on transcoding a linear baseband stream of video and audio into a highly compressed linear stream carried in Internet Protocol (IP) packets. The transcoding process typically introduces a delay because of the processing time necessary to generate the compressed linear stream. The delay varies unpredictably depending on the encoding complexity of each frame of video. Because of the unpredictable delay, IP encoded streams cannot be delivered frame accurately. As a result, local content providers could at best only guess at where in the received digital video stream to insert local replacement commercials. In other words, the local content providers were unable to match, on a frame accurate basis, the replacement triggers specified in the original broadcast video.

A need has long existed to address the problems noted above and others previously experienced.

SUMMARY

A content insertion system helps locate where, in a digital video stream delivered to an endpoint, custom content should be inserted. Accordingly, as one example, a local media provider may insert into the video stream custom commercials tailored to the specific location served by the local media provider. With frame accuracy, the content insertion system inserts content insertion triggers into the delivered digital video streams. To that end, the system determines the trigger positions at which insertion triggers occur in a source signal (e.g., in a live video broadcast). This determination may proceed with reference, as examples, to timecode accompanying or generated for the source video input. The system then locates the corresponding trigger positions in the output video stream, and inserts corresponding content insertion triggers into the output video stream as the content insertion system communicates the video stream to downstream players.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. In the figures, like reference numerals designate corresponding parts throughout the different views.

DETAILED DESCRIPTION

Figure 1:
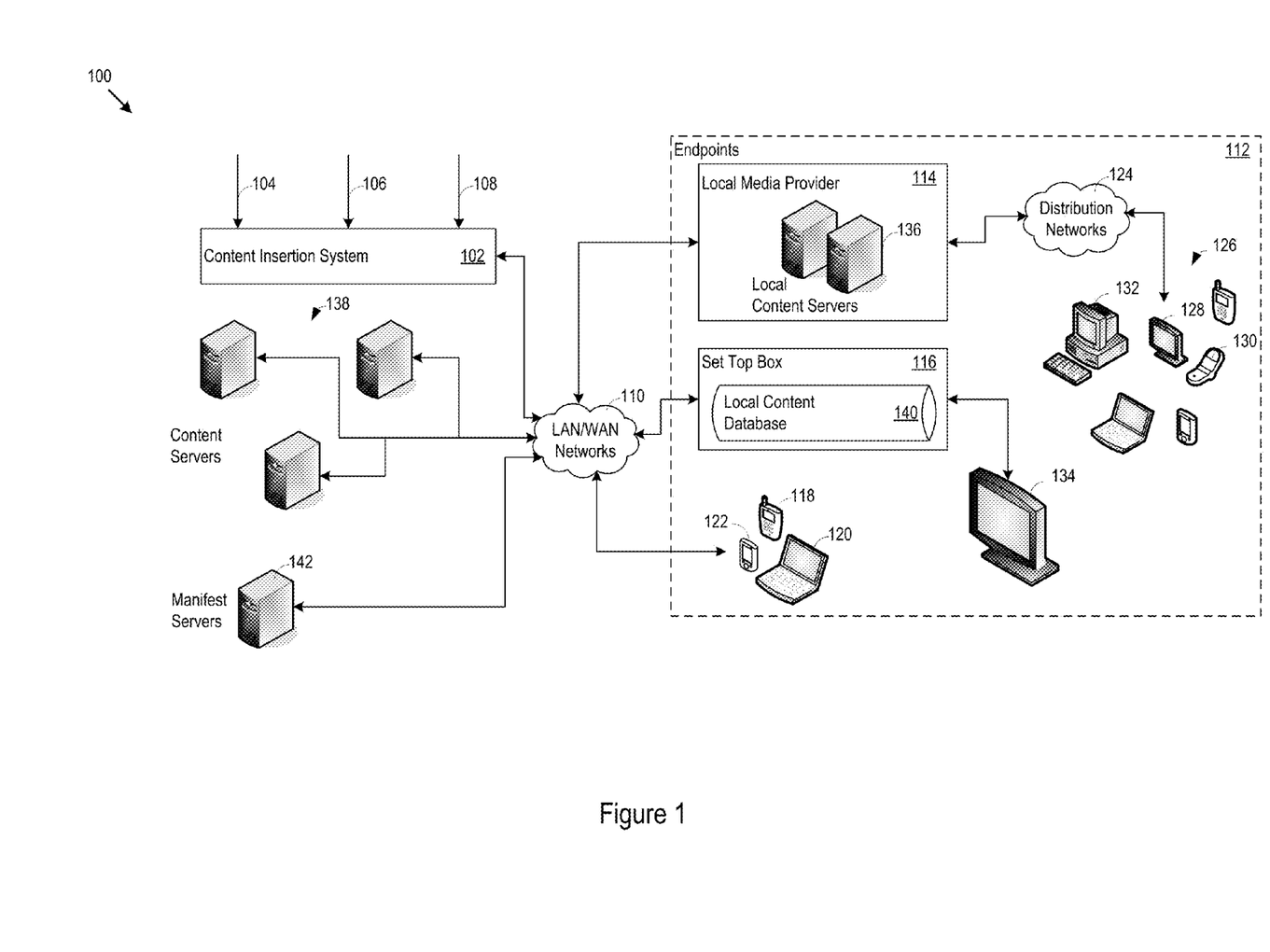
FIG. 1 shows a communication architecture that includes a frame accurate content insertion system.

FIG. 1 shows a communication architecture 100 that includes a frame accurate content insertion system 102 ("system 102"). The system 102 obtains a source signal from potentially many different input feeds. As examples, the input feeds may include satellite feeds 104, fiber optic input feeds 106, and cable connection feeds 108. The feeds 104-108 deliver, as source signals, live video broadcast signals to the system 102 for processing.

The discussion below makes reference to live broadcast video and replacement commercial content. However, the system 102 may process different types of source signals for different types of content insertion. For example, the system 102 may identify, in general, content insertion triggers in pre-recorded broadcast video for identifying and replacing, on a frame accurate basis, substantive portions of the pre-recorded broadcast video with any desired content. One potential application is to add, remove, or otherwise change specific types of content (e.g., scenes of violence) with more desirable content downstream (e.g., less violent replacement scenes). Besides audio and video, other examples of content that may be inserted into the output signal communicated downstream include banner advertisements, media player control instructions (e.g., an instruction to retrieve and display a banner advertisement specified in the instruction), content identifiers (e.g., movie and actor names) and firmware updates.

The live video broadcast signals include content insertion triggers (e.g., commercial triggers) located at trigger positions typically specified down to the level of a single frame. Thus, the commercial insertion triggers in the source signal specify where, on a frame accurate basis, a downstream player should insert a replacement commercial. The system 102 includes a transcoder that converts the live broadcast video into an output signal having different characteristics than the live broadcast video. For example, the transcoder may be an IP encoder that produces a highly compressed version of the live broadcast signal as a digital output signal. For some output signals (e.g., H.264 or Adobe™ Flash™ streams), the system 102 locates, in the output signal, output trigger positions that correspond to source signal positions of the source signal content insertion triggers and, at the output trigger positions, inserts output signal content insertion triggers corresponding to the source signal content insertion triggers. For other output signals (e.g., Microsoft™ Silverlight™ streams), the system 102 may insert content insertion triggers into a manifest file (in whatever form the manifest file syntax specifies) that downstream endpoints access to determine when and where to insert replacement content.

The system 102 communicates the output signal over the Local Area Networks/Wide Area Networks (LAN/WAN) 110 to the endpoints 112. The endpoints 112 may be any of a wide range of devices. As examples, the endpoints 112 may be local media provider 114, set top boxes 116, mobile phones 118, computers 120, and personal data assistants (PDAs) 122.

The local media provider 114 may be a local broadcasting company, an Internet service provider (ISP), or other provider. The local media provider 114 receives the output signal from the system 102 and reacts to the output signal content insertion triggers to insert replacement content on a frame accurate basis. Furthermore, the local media provider 114 may then communicate the resulting video stream (including the replacement content) over the distribution networks 124 to additional endpoints 126. Examples of such additional endpoints 126 include digital or analog televisions 128, smart phones 130, and computers 132. The set top boxes 116 may be, as one example, set top boxes provided by a local cable company to drive content to a television or other display 134.

The output signal from the system 102 need not be processed by a local media provider 114 or set top box 116, however. Instead, any of the endpoints 112, such as the computers 120, may directly receive the output signal. Such endpoints 112 may include media player software (e.g., Abode™ Flash player, a Silverlight™ player, or an H.264 media player) that receives, decodes, and displays the decoded output signal. The media player software may react to the output signal content insertion triggers by inserting, on a frame accurate basis, replacement content as instructed by the output signal content insertion triggers. Alternatively, the media player software may regularly check a locally or remotely hosted manifest file (e.g., in the case of a Silverlight™ player) to determine when to insert replacement content as playback of the received output signal occurs.

Any of the endpoints 112 may obtain the replacement content (e.g., commercial audio and video data) for insertion from a wide range of sources. For example, the local media provider 114 may obtain the replacement content from local content servers 136, remote content servers 138, or from other data sources. As another example, the set top box 116 may include a local content database 140. The local content database 140 may take the form of a hard disk, non-volatile memory, web or browser cookies, or other memory inside the set top box 116 that the cable company programs with predetermined replacement content. For endpoints that include media players that operate in conjunction with manifest files, the players may obtain the manifest file data from local or remote manifest servers 142, or by receiving manifest file data from the system 102.

The networks 110 and 124 may adhere to a wide variety of network topologies and technologies. For example, the networks 110 and 124 may include Ethernet and Fiber Distributed Data Interconnect (FDDI) packet switched networks communicating Transmission Control Protocol/Internet Protocol (TCP/IP) packets, or any other communication protocol data. Furthermore, the distribution networks 124 may include satellite, cable, or microwave transceivers that broadcast the video stream (including replacement content) in analog or digital form to the additional endpoints 126. Thus, the networks 110 and 124 represent a transport mechanism or interconnection of multiple transport mechanisms for data exchange between the system 102, content servers 138, manifest servers 142, and the endpoints 112.

Figure 2:
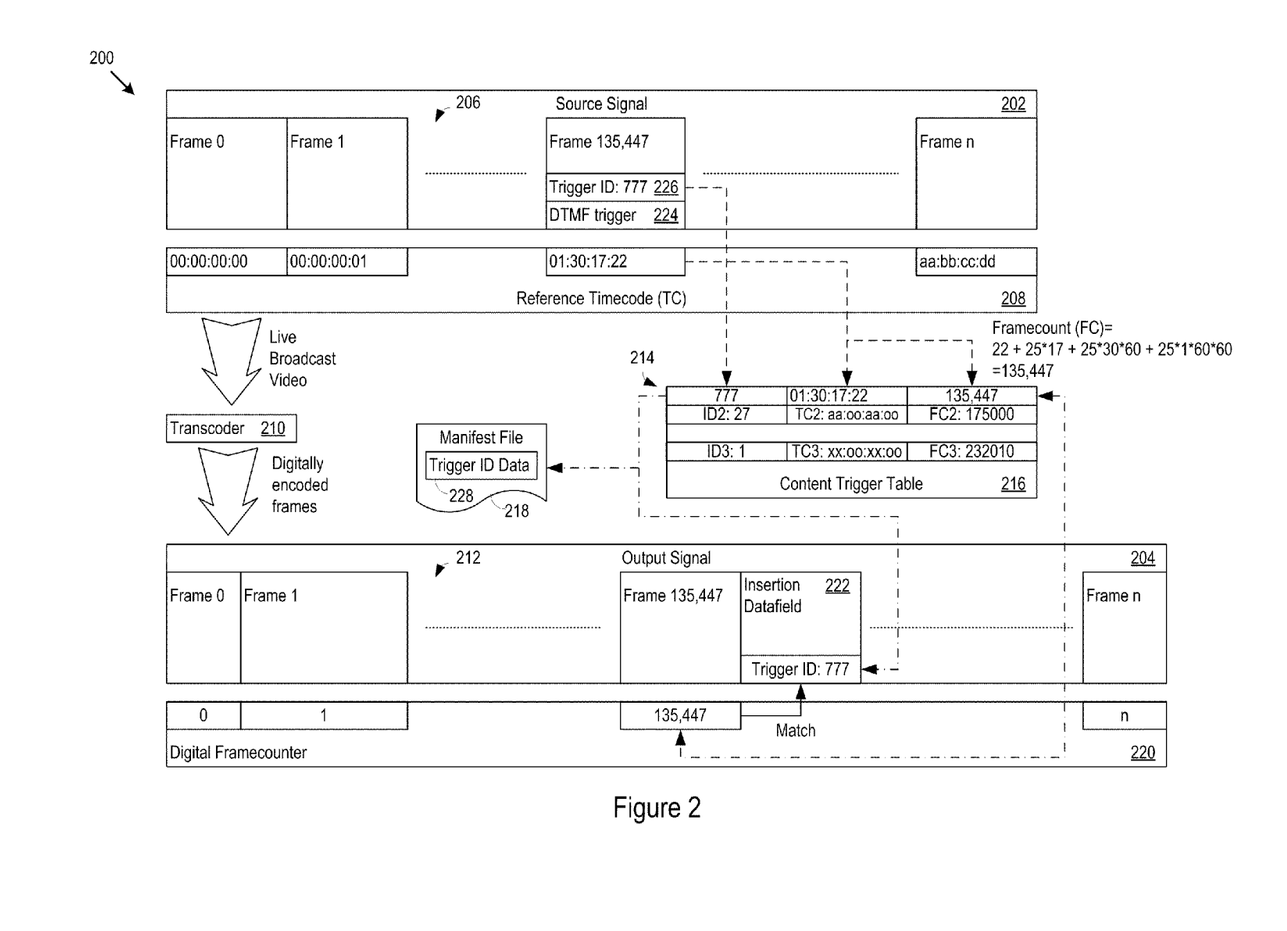
FIG. 2 shows a signal diagram showing the relationship between content triggers in a source signal and content triggers in an output signal.

FIG. 2 shows a signal diagram 200 that illustrates the relationship between content triggers in a source signal 202 and content triggers in an output signal 204. The source signal 202 arrives as, for example, a live broadcast sequence of analog video frames 206. The reference timecode 208 may be house time code produced by a house timecode generator or may be timecode accompanying the source signal 202 as the source signal 202 is received. A transcoder 210 converts the source signal 202 into a sequence of digital frames 212 that form the output signal 204. Examples of transcoders 210 include IP encoders that generate H.264, Flash™, or Silverlight™ streams.

The reference timecode 208 specifies, for example, the hour, minute, second, and frame, of each frame 206 in the source signal. Examples of suitable timecode 208 that the system 102 may employ include Society of Motion Picture and Television Engineers (SMPTE) timecodes, such as Vertical Interval TimeCode (VITC) and Linear TimeCode (LTC). The system 102 may work with other timecode formats. The source signal 202 may or may not adhere to a recognized video signal standard, such as the 24 frames per second (FPS) film high definition standard, 25 FPS PAL standard, 29.97 FPS Phase Alternate Line (PAL)-M standard, 25 FPS Séquentiel couleur à mémoire (SECAM) standard, 29.97 FPS National Television System Committee (NTSC) standard, or 30 FPS High Definition Television standard.

In the example shown in FIG. 2, the timecode 01:30:17:22 marks frame number 135,447 (22+25*17+25*60*30+25*1*60*60) from the beginning of the source signal, assuming a 25 FPS source signal 202. At frame 135,447, the broadcaster of the source signal 202 has inserted a DTMF source signal content insertion trigger 224, with corresponding trigger identifier 226 (in this instance "777"). Accordingly, the source signal 202 specifies that replacement content should occur starting at frame 135,447. The substance of the replacement content will be the content identified by trigger identifier 777. The trigger identifier 226 may be encoded in the source signal 202, as examples, in the audio or video sections of the source signal 202. The trigger identifier 226 may also be generated, obtained, or specified by the system 102 responsive, for example, to a list of insertion content and trigger positions provided by a third party to the system 102.

Accordingly, the system 102 treats frame 135,447 as a trigger position at which custom content will be inserted. For each trigger position, the system 102 saves the trigger identifier, the timecode, and the framecount in a content trigger entry 214 in the content trigger table 216. The content trigger table 216 may be a data structure in a memory (e.g., in RAM), may be a database table, or may be implemented in other ways. Alternatively or additionally, the system 102 may save, in a local or remote manifest file 218, trigger identification data 228, such as the trigger identifier, the timecode, and the framecount, in whatever format to which the manifest file adheres (e.g., a Silverlight™ manifest file). A downstream media player may then access the manifest file 218 to determine when to insert replacement content into the locally displayed video stream.

The transcoder 210 generates digital frames 212 for the output signal 204. As the transcoder 210 generates each frame, the system 102 increments the digital framecounter 220 for the output signal 204. As described in more detail below, the system 102 synchronizes the digital framecounter 220 and the timecode and framecount data for the source signal 202 so that an accurate comparison may be made to find the trigger positions in the output signal 204 that correspond to the trigger positions in the source signal 202.

As the digital framecounter 220 increments, the system 102 compares the framecount stored in the digital framecounter 220 against the content trigger entries 214 in the content trigger table 216. When a match is found (e.g., between the digital framecounter 220 value and the framecount 135,447 in the content trigger table 216), the system 102 inserts an output signal content insertion trigger 222 at the current frame in the output signal 204 (the correct trigger position to maintain frame accuracy with the source signal 202 content triggers). The output signal content insertion trigger 222 may include the trigger identifier obtained from the content trigger table 216, the framecount, and/or any other trigger-characterizing data that the system obtains. The transport mechanism for the output signal content insertion trigger 222 may vary depending on the output signal format. As examples, the transport mechanism may be a predefined data field in an H.264 stream, or the direct insertion of a trigger identifier in a Flash output stream.

Downstream, the endpoints 112 receive the output signal 204. Media players, for example, in the endpoints 112 parse the output signal 204 and find the frame accurate output signal content insertion triggers (e.g., the trigger 222). The endpoints 112 respond to the output signal content insertion triggers by retrieving and inserting the replacement content at exactly the correct frame.

To that end, an endpoint 112 may extract the trigger identifier (e.g., "777") and query a local or remote database, content server 138, or other trigger information source, to determine what replacement content (e.g., what commercial) is associated with the trigger identifier. The database, content server 138, or trigger information source may return, for example, a Uniform Resource Locator (URL) (e.g., a distributed URL link, or a set of the next 5, 10, or other number 'n' of URL links for upcoming replacement content) to the endpoint 112 in response to the query. The endpoint 112 executes a data retrieval operation on the resource link to obtain the replacement insertion data. However, as noted above, the endpoints 112 may obtain the replacement insertion data from local databases, or in other ways.

Figure 3:
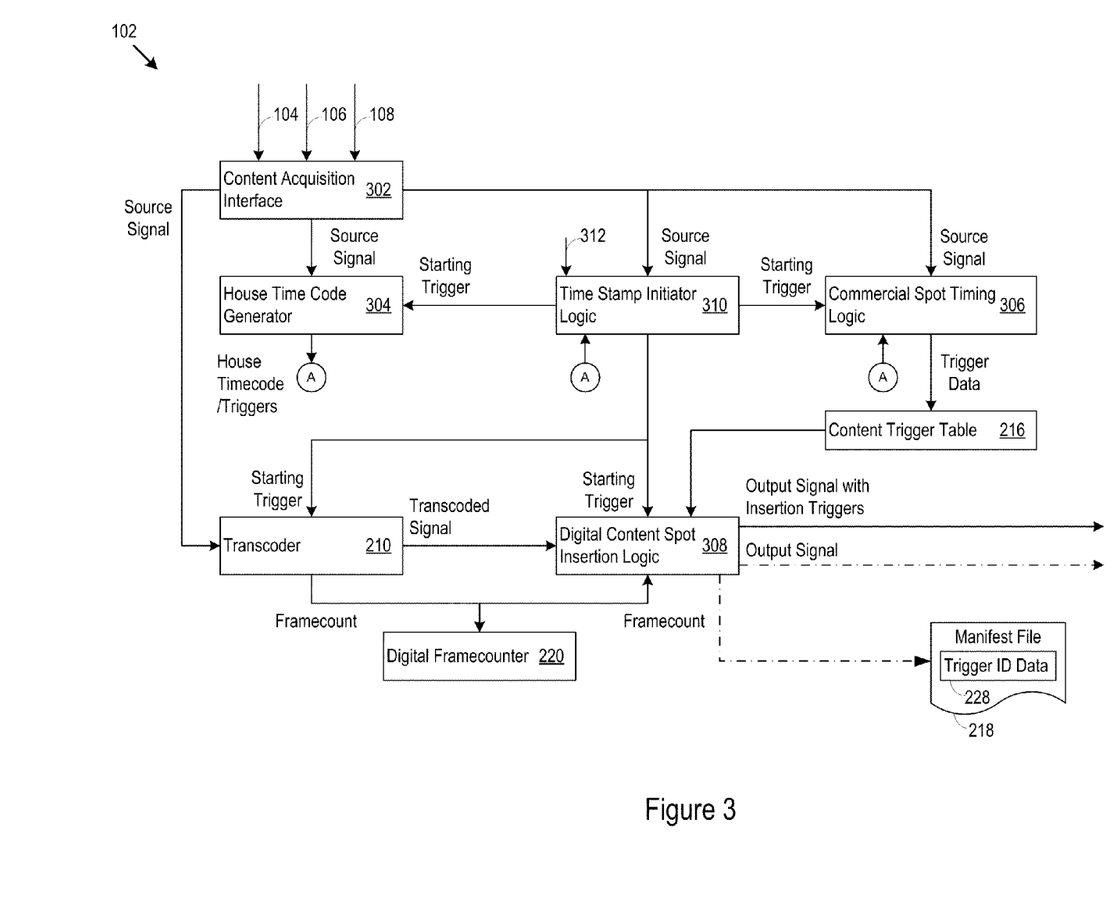
FIG. 3 shows a content insertion system.

FIG. 3 shows an example implementation of the content insertion system 102. A content acquisition interface 302 obtains the source signal 202 from any desired input connection. As examples, the content acquisition interface 302 may include a satellite signal receiver for the satellite feed 104, an optical receiver for the fiber optic input feeds 106, or a Radio Frequency (RF) receiver for the cable connection feeds 108.

A house timecode generator 304 creates internally (with respect to the system 102) synchronized replacement timecode for the source signal. The house timecode generator 304 also serves as a secondary source of timecode when the source signal arrives with timecode already included. Commercially available timecode generators from the Denecke, JVC, Burst, or other companies may implement the house timecode generator 304, as examples.

The system 102 maintains a synchronized system-wide reference for a start time (e.g., zero framecount). In particular, the time stamp initiator logic (TSIL) 310 may issue a starting trigger signal to the components in the system 102. In response to a starting trigger signal, the components reset to a reference time (e.g., framecount 0) and start incrementing framecounts from the reference time. In particular, the TSIL 310 resets the house timecode generator 304 and digital framecounter 220 to the reference time for accurate framecount comparison purposes. The synchronized house timecode may replace the source signal timecode (if any) received with the source signal for the purposes of trigger location and insertion of trigger data into the content trigger table 216.

In some implementations, the TSIL 310 may issue the starting trigger in response to a manual input signal received on a reset input 312 (e.g., a reset switch or touchscreen graphical user interface input). An operator may provide the manual input signal whenever it is desired to reset the system 102 to a common reference time, such as when a live broadcast begins, for example, or according to other criteria. In other implementations, the TSIL 310 analyzes signal content (e.g., to find program codes or other data) in the source signal 202 to automatically determine when to issue the starting trigger signal (e.g., when a program code indicates start of program).

The TSIL 310 analyzes the source signal 202 to identify the source signal content insertion triggers. The source signal content insertion triggers may be DTMF tones, General Purpose Interface (GPI) triggers, or other content insertion triggers located in the source signal 202 according to defined broadcast standards. As it locates content insertion triggers, the TSIL 310 communicates trigger location messages to the commercial spot timing logic (CSTL) 306. The trigger location messages may specify that the TSIL 310 has located a source signal content insertion trigger. The trigger location messages may further specify the trigger identifiers, and trigger positions (e.g., in terms of timecode or framecount) as determined by the TSIL 310.

Alternatively, the CSTL 306 may, in response to the trigger location messages, analyze the source signal 202 and timecode 208 to determine the trigger identifiers and trigger positions. The CSTL 306 populates the content trigger table 216 with the trigger identifier, timecode, and framecount (or any other desired trigger characterizing data). For this purpose, the CSTL 306 may use, as the reference timecode 208, the house timecode that the TSIL 310 synchronized with the starting trigger.

Additionally or alternatively, the house timecode generator 304 may search for and locate indicia that determine where replacement content should be inserted. For example, the house timecode generator 304 may detect black or grey frames and flag those frames for the TSIL 310 or CSTL 306 as trigger positions in the source signal 202. The system 102 may employ the house timecode generator 304 to flag trigger positions when, for example, any portion of the source signal 202 does not include explicit content insertion triggers.

From the source signal 202, the transcoder 210 generates a transcoded signal that includes digital output frames corresponding to the input frames in the source signal 202. The transcoder 210 may be an IP encoder available from Inlet Technologies, Digital Rapids, Axis, or American Dynamics, as examples. The digital content spot insertion logic (CSIL) 308 or the transcoder 210 increments the digital framecounter 220 with each new digital output frame generated by the transcoder 210. The CSIL 308 compares the framecount in the digital framecounter 222 against the content trigger entries 214 (e.g., against the framecounts) in the content trigger table 216 to find matches. The matches may indicate the frame accurate position at which an output signal content insertion trigger should be inserted so that replacement content will be inserted at the correct position in the output signal 204. The matches may also indicate when trigger identification data 228 (e.g., trigger identifiers, timecode, and framecounts) should be written to the manifest file 218. Thus, by finding a framecount match, the CSIL 308 locates in the output signal 204 the correct trigger position. The CSIL 308 may then insert into the output signal 204 an output signal content insertion trigger (e.g., specifying the trigger identifier in a pre-defined data field for insertions defined by the H.264 standard). In addition, the CSIL may add corresponding trigger identification data 228 into the manifest file 218.

The CSIL 308 may delay the output signal 204. In particular, the CSIL 308 may introduce a delay in the output signal 204 to accommodate for the processing time to increment and read the digital framecounter 220, search for matches in the content trigger table 216, insert output signal content insertion triggers, insert data into the manifest file 218, and take other processing steps for frame accurately preparing the output signal. These processing steps should occur prior to the frame corresponding to the desired trigger location passing out of the system 102 as part of the output signal 204. In some instances, the output signal delay may be on the order of 10 to 15 seconds. However, the system 102 may set the CSIL 308 to use whatever delay, regardless of how long or how short, will allow the framecount matching and content trigger insertion to execute without missing frames in the output signal that correspond to trigger positions.

Figure 4:
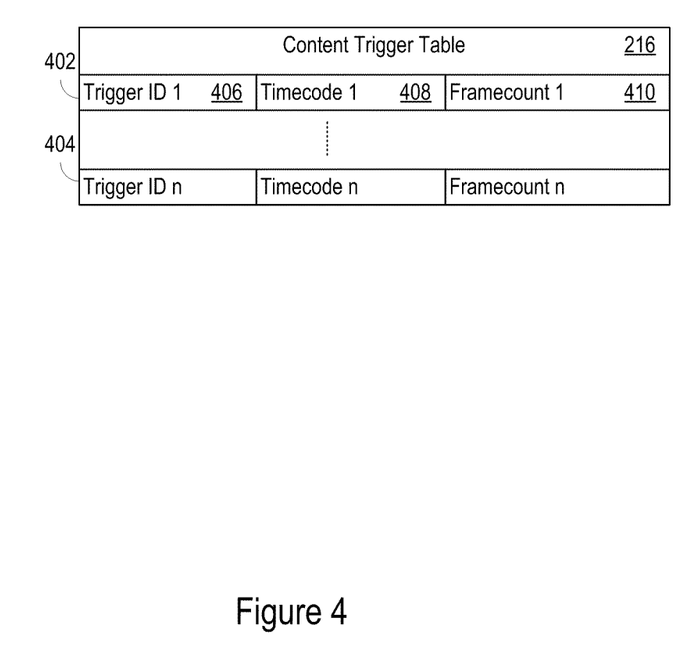
FIG. 4 shows a content trigger table.

FIG. 4 shows an example implementation of the content trigger table 216. In the example shown, the content trigger table includes any number of rows of content trigger entries (e.g., the content trigger entries 402 and 404). Each content trigger entry may include a trigger identifier 406, a timecode 408 at which the system 102 found a content insertion trigger corresponding to the trigger identifier 406, and a framecount 410 giving the number of frames (e.g., from the beginning of the source signal) at which the system 102 found the insertion trigger. Other implementations of the content trigger table 216 may include additional, less, or different content trigger identifying data. Furthermore, the system 102 may save any or all of the content trigger table 216 as a record against which content insertion may be verified, e.g., to ensure that all of the specified trigger locations were found and communicated to the downstream endpoints.

Figure 5:
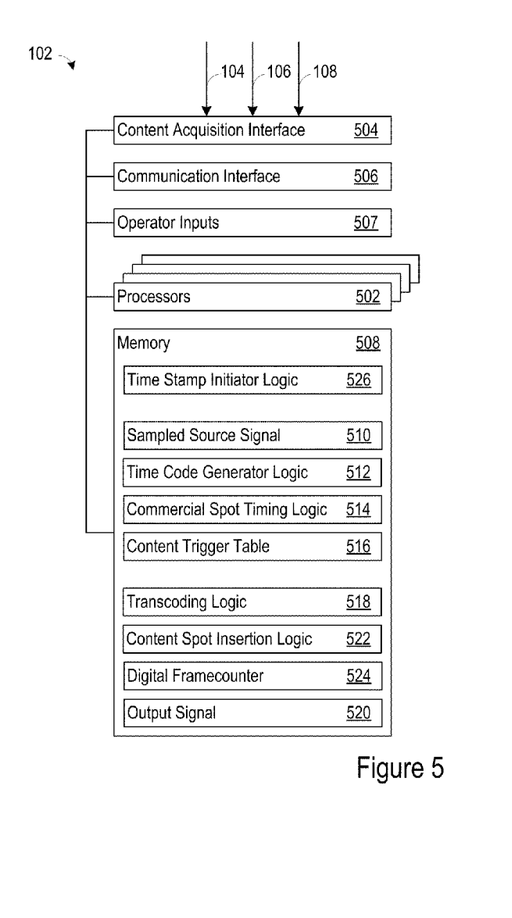
FIG. 5 shows a content insertion system.

FIG. 5 shows another example implementation of a content insertion system 102. In the example in FIG. 5, digital signal processors 502 connect to a content acquisition interface 504, a communication interface 506, operator inputs 507 and a memory 508. The content acquisition interface 504 may include analog to digital converters, for example, for generating a digitally sampled rendition of the source signal 510 in the memory 508. The time code generator logic 512 may then be implemented as processor executable instruction that output timecode frame by frame responsive to the sampled source signal 510. Similarly, the commercial spot timing logic 514 may be implemented as processor executable instructions that analyze the sampled source signal 510 to find the source signal content insertion triggers and trigger positions, and to store the content trigger entries in the content trigger table 516.

The time stamp initiator logic 526 may respond to the operator inputs 507 (e.g., to button inputs or touchscreen input) and responsively output the starting trigger to the other logic in the memory 508. Alternatively or additionally, the time stamp initiator logic 526 may analyze the sampled source signal 510 for indicia on which to automatically generate the starting trigger.

The transcoding logic 518 may be a software IP encoder, for example, that generates the digital frames of the output signal 520, given the sampled source signal 510. The content spot insertion logic 522 includes instructions that compare the framecount stored in the digital framecounter 524 against the content trigger table 516. Either the transcoding logic 518 or the content spot insertion logic 522 may increment the digital framecounter 524 as new frames for the output signal 520 are generated. When the content spot insertion logic 522 finds a match, it inserts into the output signal 520 an output signal content insertion trigger, for example by specifying the trigger identifier in a Flash video output stream.

Figure 6:
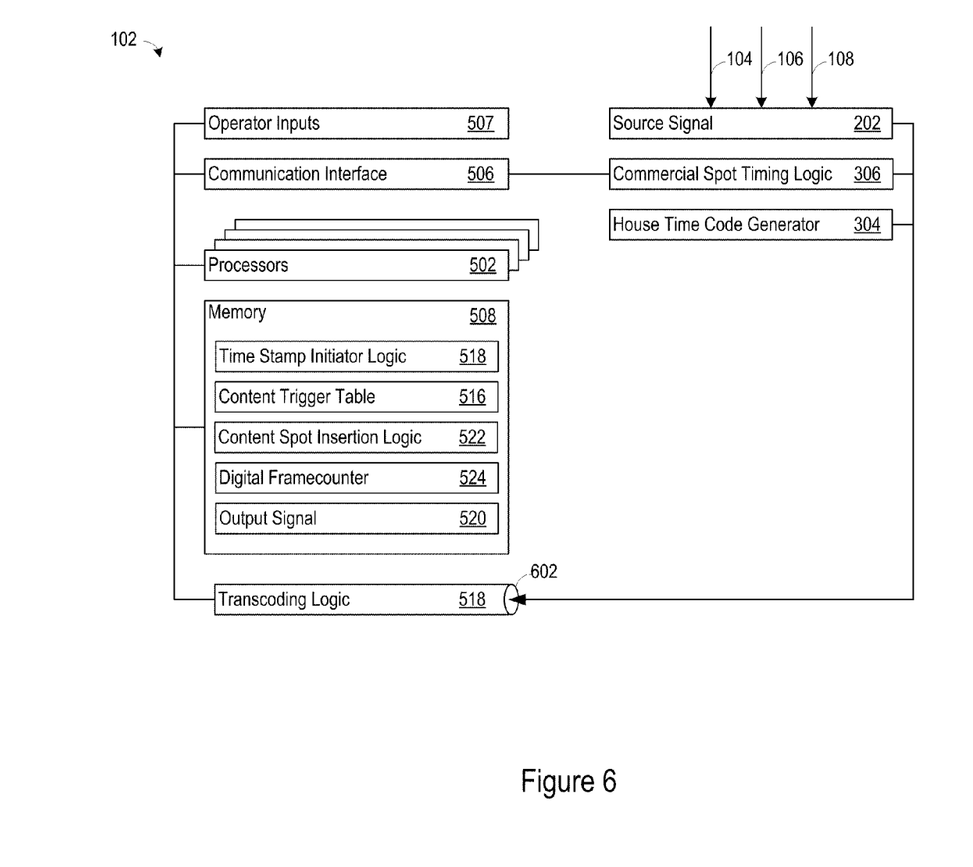
FIG. 6 shows a content insertion system.

FIG. 6 shows another example implementation of the content insertion system 102. In FIG. 6, the source signal 202 is processed by separate hardware or software modules for the CSTL 306, and a separate house timing code generator 304 provides timecode for the source signal. The CSTL 306 communicates content trigger entries for storage in the content trigger table 516 through the communication interface 506, by direct memory access, or other technique. To that end, the communication interface 506 may be a message passing interface, a remote procedure call interface, an application programming interface, or other communication interface. In addition, the source signal 202 channels into the transcoding logic 518 through an analog front end including an analog signal input 602. The transcoding logic 518 may then save digital output frames in the memory 508 to build the output signal 520.

Figure 7:
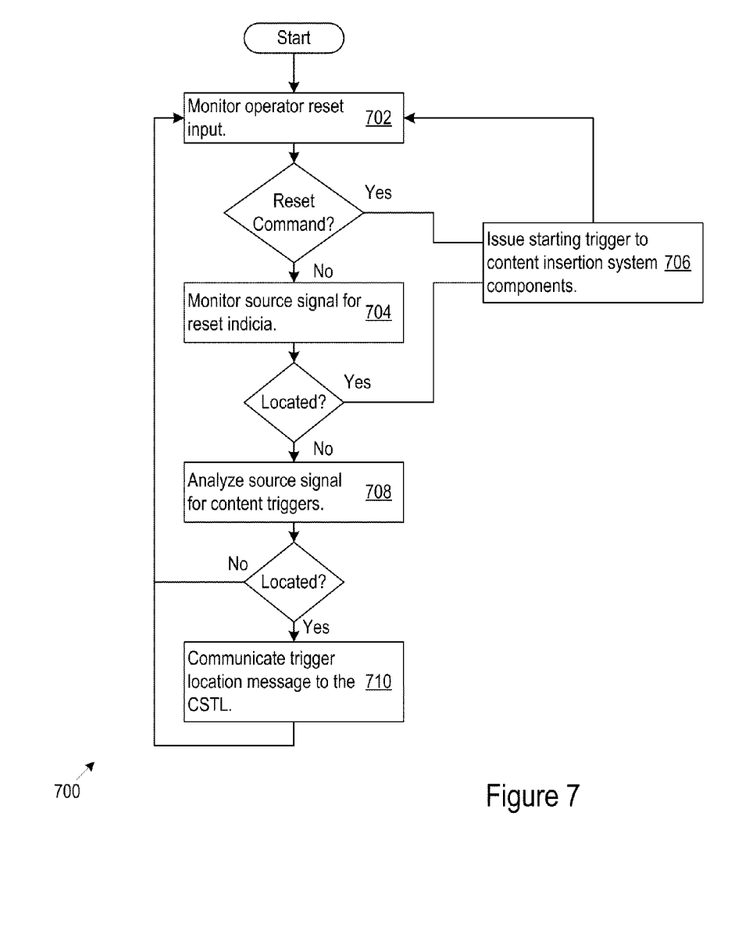
FIG. 7 shows a flow diagram of time stamp initiator logic that a content insertion system may implement.

FIG. 7 shows a flow diagram of logic 700 for the time stamp initiator logic 310 or 526, as examples. The logic 700 monitors an operator input (e.g., input 312 or input 507) for a manual reset signal (702). The logic 700 may also monitor the source signal for reset indicia (e.g., a start of program code) (704). If either condition is met, the logic 700 issues a starting trigger to the system components (706). For example, the logic 700 may issue the starting trigger to the house time code generator 304, CSTL 306, CSIL 308, and transcoder 210.

In addition, the logic 700 may analyze the source signal for content insertion triggers (708). As it locates the source signal content insertion triggers, the logic 700 communicates trigger location messages to the CSTL 306 (710). The trigger location messages may include trigger characterizing data, such as trigger identifiers and trigger positions. The trigger positions may be expressed in terms of framecount at which the content insertion triggers were located, timecode at which the content insertion triggers were located, or both. Alternatively, the CSTL 306 may analyze the source signal 202 to find the trigger characterizing data in response to the trigger location messages.

Figure 8:
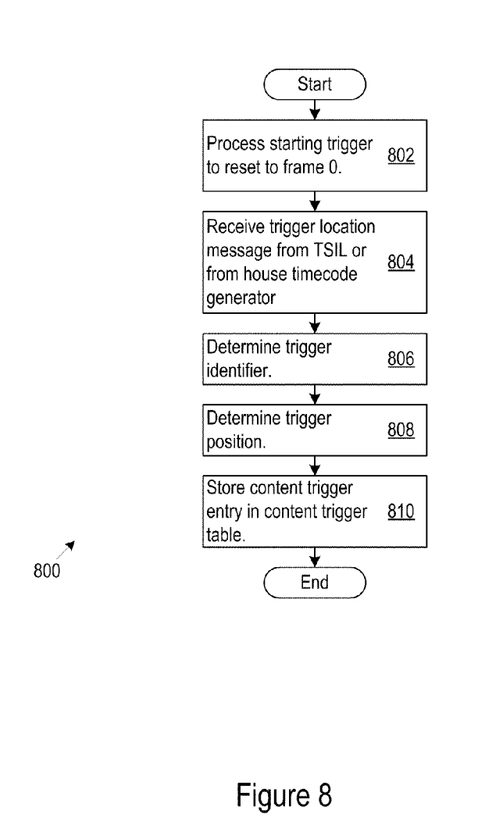
FIG. 8 shows a flow diagram of commercial spot trigger logic that a content insertion system may implement.

FIG. 8 shows a flow diagram of logic 800 for the CSTL 306 or 514, as examples. The logic 800 processes a starting trigger generated by the TSIL 310 to reset a local framecounter to a common reference time (e.g., to reset to framecount zero) (802). The logic 800 receives trigger location messages from the logic 700, from the house timecode generator 304, or other sources (804). The trigger location messages may specify that a content insertion trigger is found at the current source signal frame, but may also specify trigger identifiers, framecount at which the content insertion triggers were located, and timecode at which the content insertion triggers were located, or other trigger characterizing information.

Either from the trigger location messages, or by analyzing the source signal 202, the logic 800 may determine the trigger identifiers (806) and the trigger positions (808). With regard to the trigger positions, the logic 800 may obtain the timecode from the trigger insertion message or directly from the house timecode, as examples. With regard to the framecount stored in the content trigger table 216, the logic 800 may compute the framecount from the timecode, may increment the local framecounter by the timecode received from the TSIL 310 (or determined from the source signal 202) when a new trigger is found, or may determine or obtain the framecount in other ways or from other sources. Given the trigger identifiers and trigger positions, the logic 800 stores content trigger entries in the content trigger table (810).

In other implementations, the logic 700 (e.g., for the TSIL 310) handles the starting triggers, while the logic 800 (e.g., for the CSTL 306) searches the source signal 202 for content insertion triggers, trigger identifiers, trigger positions, and stores the trigger data in the content trigger table.

Figure 9:
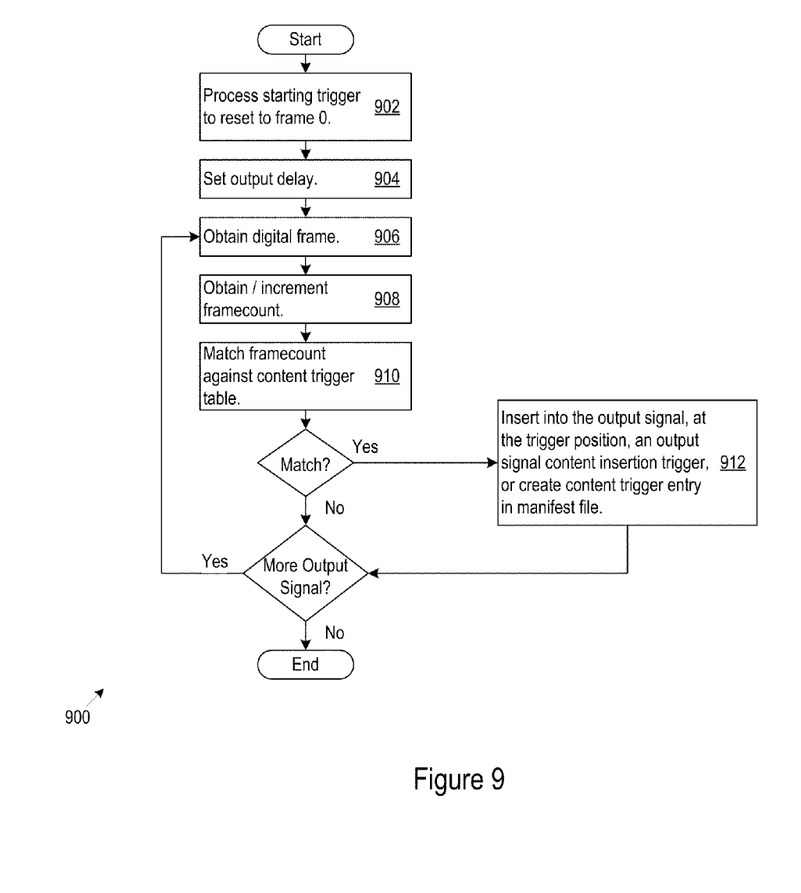
FIG. 9 shows a flow diagram of digital content spot insertion logic that a content insertion system may implement.

FIG. 9 shows a flow diagram of logic 900 for the CSIL 308 or 522, as examples. The logic 900 processes a starting trigger generated by the TSIL 310 to reset the framecount in the digital framecounter 220 to a reference time (e.g., to framecount zero) (902). The logic 900 also sets the output delay (904) for the output signal 204 to accommodate the processing delays associated with tracking framecount, matching against the content trigger table 216, inserting output signal content insertion triggers, and taking other processing actions.

The logic 900 receives digital frames from the transcoder 210 (906) and may increment the digital framecounter 220 with each received frame (908). Alternatively, the logic 900 may obtain the framecount from another source, or may allow the transcoder 210 to increment the framecounter 220 as the transcoder produces digital frames for the output signal 204.

As the digital framecounter 220 increments, the logic 900 compares the framecount against the content trigger table 216. More specifically, the logic 900 attempts to find framecount matches between the digital framecounter 220 and the framecount entries in the content trigger table 216. A match successfully locates, in the output signal 204, the trigger position where replacement content should appear. Accordingly, when the logic 900 finds a match, the logic 900 inserts into the output signal 204 (at the trigger position) an output signal content insertion trigger, or saves a corresponding content trigger entry in a manifest file (912).

Figure 10:
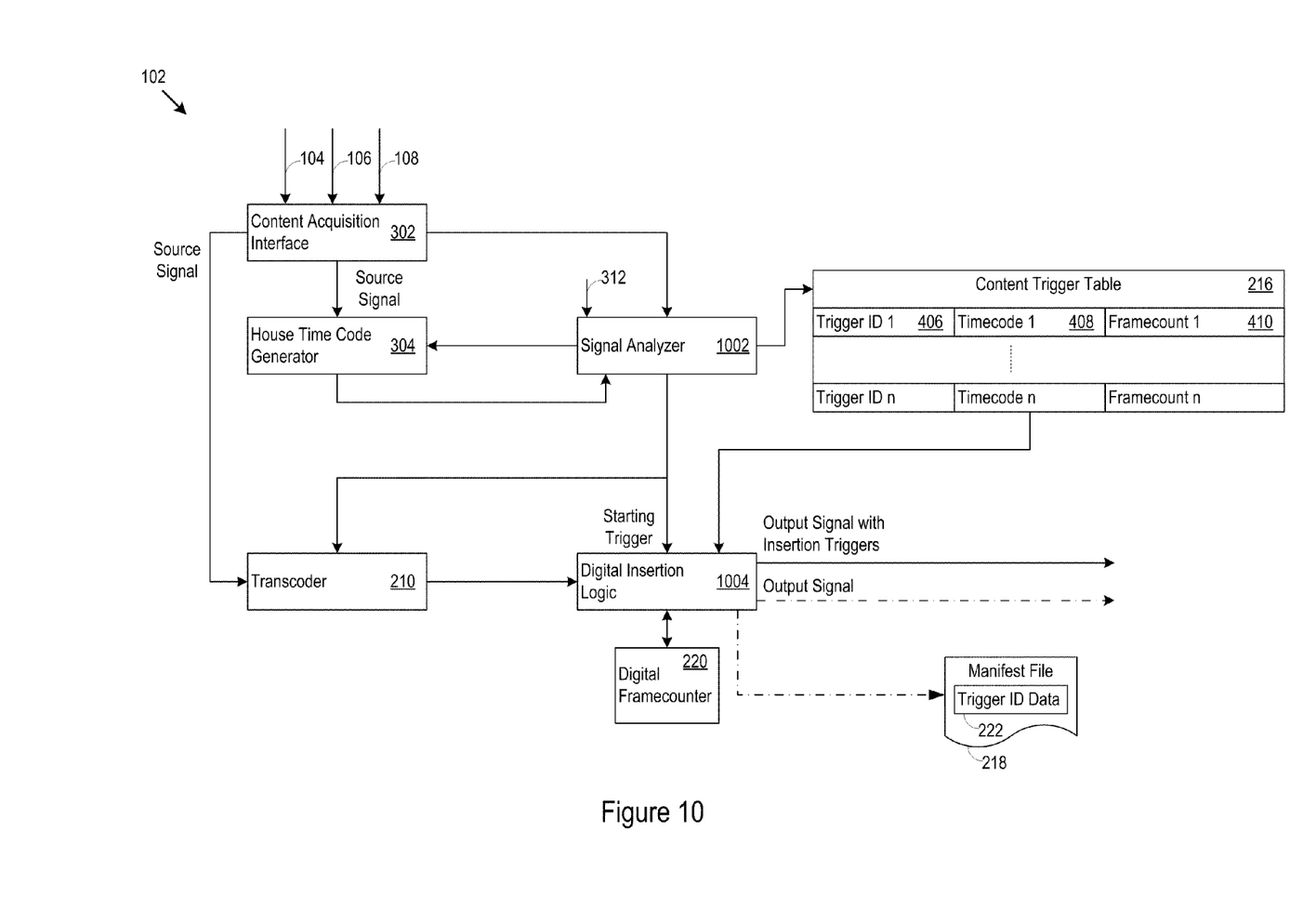
FIG. 10 shows a content insertion system.

FIG. 10 shows another example of a content insertion system 102. In the example shown in FIG. 10, much of the functionality described above is largely divided between a signal analyzer 1002 and digital insertion logic 1004. In particular, the signal analyzer 1002 may include logic, whether in hardware, software, or both, that analyzes the source signal 202 to find the source signal content insertion triggers. The signal analyzer 1002 also determines the trigger position in the source signal where the source signal content insertion trigger is located, as well as the trigger identifier, or other trigger characterizing information. The signal analyzer 1002 stores corresponding content trigger entries in the content trigger table 216. Furthermore, the signal analyzer 1002 may provide a starting trigger for the rest of the system 102 to reset the system 102 to a common reference time (e.g., frame 0 for the purposes of internal counting).

The digital insertion logic 1004 may include logic, whether in hardware, software, or both, that receives digital video frames from the transcoder 210. The digital video frames form the output signal 204, and the digital insertion logic 1004 may maintain a count of the video frames in the digital framecounter 220. The digital insertion logic 1004 matches the framecount in the digital framecounter 220 against the trigger position information in the content trigger table 216. When a match is found, the digital insertion logic 1004 has located a correct trigger position in the output signal. The digital insertion logic 1004 then creates an output signal content insertion record that is frame accurate with respect to the source signal content insertion trigger. In one form, the output signal content insertion record is an insertion into the output signal, at the trigger position, of an output signal content insertion trigger. An example of an output signal content insertion trigger is a trigger identifier from the content trigger table 216 inserted into a predefined data field in an H.264 stream. In another form, the output signal content insertion record is a manifest file entry stored in a manifest file that will be read and processed by a downstream player of the output signal 204. The manifest file entry may specify trigger characterizing information, including trigger identifiers and trigger position.

The system 102 implements technical solutions to the technical problem of frame accurate content insertion in digital media streams. The technical solutions include having the system 102 use a source signal (e.g., a live broadcast stream signal) prior to digital encoding to drive insertion of content triggers into the output signal post-encoding. Another technical solution is having the system 102 match digital framecount post-encode with framecount obtained from the timecode of the source signal pre-encode. Another technical solution is issuing a starting trigger synchronization signal to the system components to keep the source signal processing components (e.g., the house timecode generator 304, TSIL 310, and CSTL 306) synchronized with the digital output signal processing components (e.g., the transcoder 210 and CSIL 308).

The content triggers in the output signal 204 are frame accurate with respect to the corresponding content triggers in the source signal. As a result, each of the endpoints that receives the output signal may frame-accurately insert replacement content, and every endpoint may display such replacement content at the correct and identical frame time. The endpoints 112 redirect a media player to replacement content on a frame accurate basis, and then redirect the media player back to the original video stream when all the replacement content has played, or the replacement content insertion time has ended.

In general, the logic and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device. The medium may be implemented as any device or tangible component that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions that perform the processing described above, or in software in an application programming interface (API) or in a Dynamic Link Library (DLL), functions available in a shared memory or defined as local or remote procedure calls, or as a combination of hardware and software. As examples, the transcoder 210, framecounter 220, TSIL 310, CSTL 306, or CSIL 308 may be implemented in software, hardware, or both. The logic may be functionally partitioned to meet to goals of any specific implementation. For example, the TSIL 310 and CSTL 306 may be separate processing systems or individual programs, or may be integrated into a single processing system or program. Communication between the components in the system 102 may be RS-422 communication, or adhere to other types of communication protocols. For example, the TSIL 310 may exchange trigger location information with the CSTL 306 via the RS-422 protocol.

The systems may include additional or different logic and may be implemented in many different ways. A processor may be implemented as a controller, microprocessor, digital signal processor, microcontroller, application specific integrated circuit (ASIC), discrete logic, or a combination of other types of circuits or logic. Similarly, memories may be Dynamic Random Access Memory (DRAM), Static Random Access Memory (SRAM), Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, implemented in libraries such as Dynamic Link Libraries (DLLs), or distributed across several memories, processors, cards, and systems.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method comprising:
   locating, in a source signal comprising a predetermined frame timing, a source signal content insertion trigger;
   determining a trigger identifier for the source signal content insertion trigger, the trigger identifier specifying replacement content for an output signal;
   determining a trigger position in the source signal where the source signal content insertion trigger is located;
   storing the trigger identifier and the trigger position in a content trigger table;
   transcoding the source signal, at a transcoding rate that does not meet the predetermined frame timing of the source signal, to obtain the output signal, wherein the transcoding rate varies for a first frame and a second frame in the source signal based on a difference in complexity in the first and second frames in the source signal;
   keeping a framecount of frames output during the transcoding of the source signal;
   introducing a delay into the output signal to accommodate for a processing time to frame accurately prepare the output signal;
   locating, in the output signal, the trigger position by comparing the framecount against the trigger position in the content trigger table; and
   inserting into the output signal, at the trigger position, an output signal content insertion trigger.

2. The method of claim 1, where locating the source signal content insertion trigger comprises:
   locating, in the source signal, any combination of a dual tone multifrequency (DTMF) content insertion signal and a General Purpose Interface (GPI) content insertion signal.

3. The method of claim 1, where determining the trigger position in the source signal comprises:
   obtaining a timecode for the source signal that identifies the trigger position; or
   obtaining a framecount into the source signal that identifies the trigger position; or both.

4. The method of claim 1, where locating, in the output signal, the trigger position further comprises:
   matching the framecount to the trigger position.

5. The method of claim 1, further comprising:
   issuing a starting trigger signal to synchronize determining the trigger position in the source signal and the trigger position in the output signal.

6. The method of claim 1, where transcoding comprises:
   Internet Protocol encoding the source signal to obtain the output signal.

7. The method of claim 1, where inserting the output signal content insertion trigger comprises inserting the trigger identifier into the output signal at the trigger position.

8. A content insertion system comprising:
   a content acquisition interface that obtains a source signal;
   a signal analyzer in communication with the content acquisition interface, the signal analyzer configured to:
      locate, in the source signal comprising a predetermined frame timing, a source signal content insertion trigger;
      determine a trigger identifier for the source signal content insertion trigger, the trigger identifier specifying replacement content for an output signal; and
      determine a trigger position in the source signal where the source signal content insertion trigger is located, wherein the signal analyzer is configured to determine the trigger position by:
         obtaining a timecode for the source signal that identifies the trigger position; and
         determining, based on the obtained timecode, a framecount in the source signal that identifies the trigger position;
   a content trigger table configured to store the trigger identifier and the trigger position;
   a digital framecounter that maintains a framecount for the output signal;
   a transcoder in communication with the content acquisition interface that produces the output signal from the source signal at a transcoding rate that does not meet the predetermined frame timing of the source signal; and
   digital insertion logic in communication with the transcoder and signal analyzer, the digital insertion logic configured to:

locate, in the output signal, the trigger position by comparing the framecount in the digital framecounter against the trigger position in the content trigger table;

introduce a delay into the output signal to accommodate for a processing time to frame accurately prepare the output signal; and create an output signal content insertion record that is frame accurate with respect to the source signal content insertion trigger.

9. The content insertion system of claim 8, where:
the transcoder comprises an Internet Protocol encoder.

10. The content insertion system of claim 8, where the trigger position comprises a framecount within the source signal.

11. The content insertion system of claim 8, where the signal analyzer is further configured to:
synchronize the signal analyzer and the digital insertion logic to a reference start time.

12. The content insertion system of claim 8, where the output signal content insertion record comprises a manifest file entry.

13. The content insertion system of claim 8, where the output signal content insertion record comprises an insertion into the output signal.

14. The content insertion system of claim 8, further comprising a house timecode generator comprising a house timecode output that the signal analyzer employs to determine the trigger position.

* * * * *